United States Patent [19]

Malik et al.

[11] Patent Number: 5,692,153

[45] Date of Patent: Nov. 25, 1997

[54] METHOD AND SYSTEM FOR VERIFYING EXECUTION ORDER WITHIN A MULTIPROCESSOR DATA PROCESSING SYSTEM

[75] Inventors: Nadeem Malik; Brian O'Krafka; Avijit Saha; Shahram Salamian, all of Austin, Tex.

[73] Assignee: International Business Machines Corporation, Armonk, N.Y.

[21] Appl. No.: 405,058

[22] Filed: Mar. 16, 1995

[51] Int. Cl.[6] ................................................. G06F 13/00
[52] U.S. Cl. ................................................ 395/468; 395/800
[58] Field of Search ..................................... 395/468, 474, 395/477, 495, 375, 800

[56] References Cited

U.S. PATENT DOCUMENTS

| | | | |
|---|---|---|---|
| 5,148,533 | 9/1992 | Joyce et al. | 395/425 |
| 5,247,648 | 9/1993 | Watkins et al. | 395/425 |
| 5,265,232 | 11/1993 | Gannon et al. | 395/425 |
| 5,265,233 | 11/1993 | Frailong et al. | 395/425 |
| 5,276,852 | 1/1994 | Callander et al. | 395/425 |
| 5,301,298 | 4/1994 | Kagan et al. | 395/425 |
| 5,347,648 | 9/1994 | Stamm et al. | 395/575 |
| 5,379,396 | 1/1995 | Gochman et al. | 395/425 |
| 5,388,242 | 2/1995 | Jewett | 395/425 |
| 5,398,325 | 3/1995 | Chang et al. | 395/425 |
| 5,408,671 | 4/1995 | Tanaka | 395/800 |

*Primary Examiner*—William M. Treat
*Assistant Examiner*—Zarini Maung
*Attorney, Agent, or Firm*—Richard A. Henkler; Brian F. Russell; Andrew J. Dillon

[57] ABSTRACT

A method and system are disclosed for verifying consistency of an instruction execution order of a multiprocessor data processing system with a specified memory consistency model. Each processor within the multiprocessor data processing system executes instructions from an associated one of a number of instruction streams, which include instructions that store a number of unique values from multiple processors to a single selected address within memory. One of the unique values is loaded from the selected address to a particular processor within the data processing system. A set of valid values which may be returned by the loading step is determined according to the specified memory consistency model. By comparing the unique value with members of the set of valid values, the instruction execution order of the multiprocessor data processing system is verified. Utilizing the unique value which was returned by the load instruction, the set of valid values may then be updated.

10 Claims, 6 Drawing Sheets

*PRIOR ART*

Colored Data Byte

METHOD AND SYSTEM FOR VERIFYING EXECUTION ORDER WITHIN A MULTIPROCESSOR DATA PROCESSING SYSTEM

BACKGROUND OF THE INVENTION

1. Technical Field

The present invention relates in general to a method and system for verifying proper operation of a data processing system and in particular to an improved method and system for verifying proper operation of a multiprocessor data processing system. Still more particularly, the present invention relates to an improved method and system for verifying instruction execution ordering within a multiprocessor data processing system.

2. Description of the Related Art

Within multiprocessor data processing systems having a memory hierarchy and a globally accessible main memory store, maintaining memory coherency is a key design consideration. Memory coherency issues arise since absent architectural inhibition, each of the multiple processors may concurrently modify a local copy of data associated with a single main memory store address. Since the relative timing of data modifications propagating through the memory hierarchy to the main memory store is inexact, the multiprocessor data processing system requires a uniform method of assuring that consistent data is seen by all processors.

A common method of maintaining memory coherency within a multiprocessor data processing system is to implement a set of rules, often called a memory consistency model, that specifies an instruction execution order for each processor and between the multiple processors. Thus, when each of the multiple processors issues instructions that modify data associated with an address, the memory consistency model of the data processing system maintains vertical coherency by ordering certain instructions executed by each processor and maintains lateral coherency by prescribing an execution order for instructions issued by multiple processors. The types of memory consistency models utilized within multiprocessor data processing systems vary between strong ordering models, which require the execution of instructions in the precise sequential order defined by the software program, and weak ordering models, which allow out of order execution.

Figure 1:
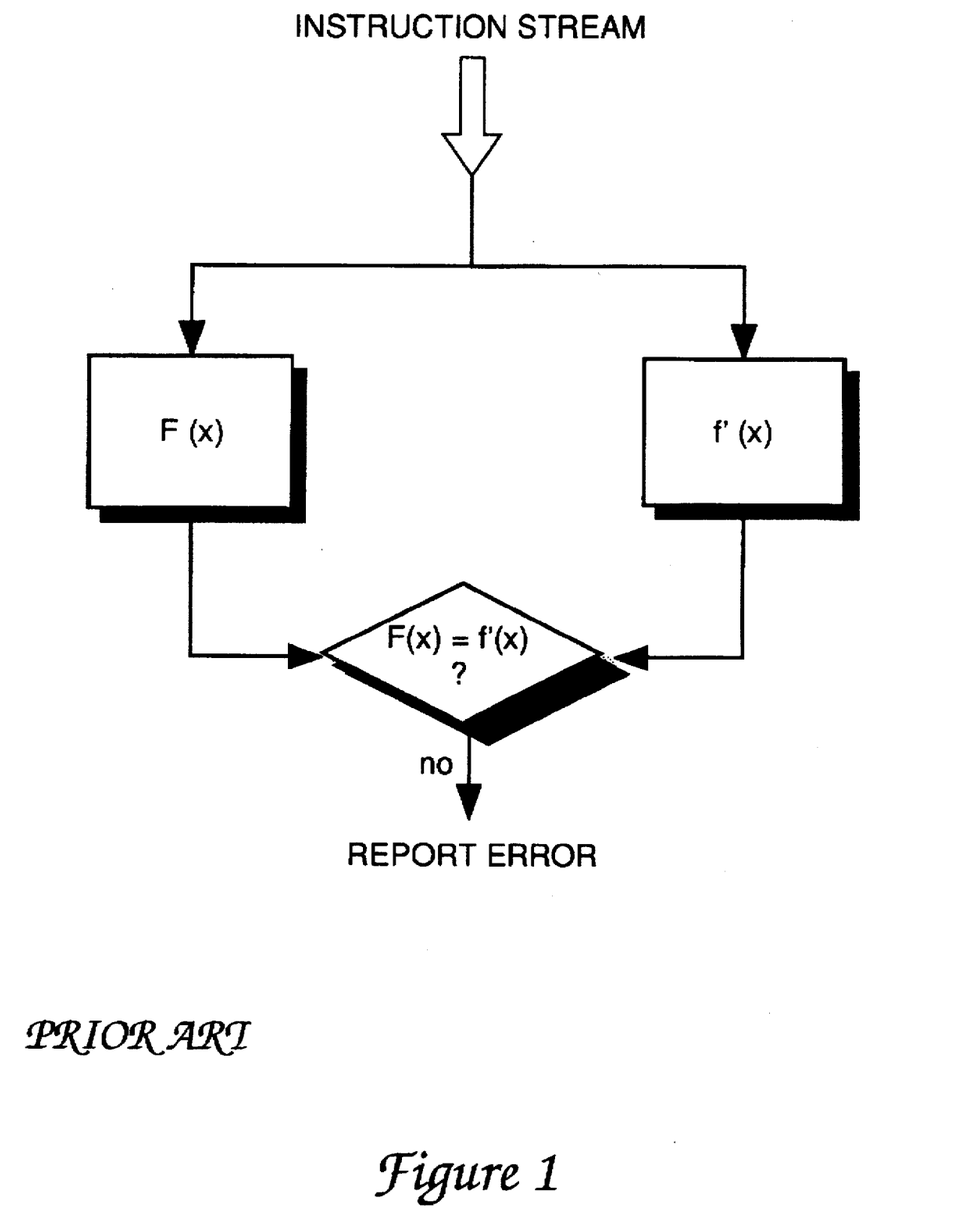
FIG. 1 illustrates a high level flowchart of a conventional method for verifying instruction execution ordering within a data processing system having a single processor.

An important aspect of both the design and testing of multiprocessor data processing systems is verification of correct implementation of a selected memory consistency model. Referring now to FIG. 1, there is illustrated a high level flowchart of a conventional method utilized to verify correct implementation of a memory consistency model within a data processing system. As illustrated, an instruction stream, representing instructions to be executed by a processor, is simultaneously input to the data processing system F(x) and a simplified, yet behaviorly correct model f'(x). The output data of the data processing system F(x) and the simplified model f'(x) are then compared to determine if the data selected as valid by the memory consistency model is returned by data processing system F(x). If F(x) does not return the data indicated by the simplified memory consistency model, an architectural error in implementing the selected memory consistency model within the data processing system has been detected.

When applied to multiprocessor data processing systems, the conventional approach to verification illustrated in FIG. 1 is typically implemented utilizing a verification methodology called "false sharing." When operating with false sharing enforced, multiple processors can access the same addressable memory segment (e.g., cache line), but are prohibited from accessing the same data byte within the memory segment. Since false sharing does not allow the verification of instruction execution ordering for instructions issued by multiple processors to an atomic memory element, false sharing limits detection of memory consistency model violations to certain execution scenarios.

A second problem which arises in conventional implementations of the verification method depicted in FIG. 1 within a multiprocessor environment is that the verification techniques typically rely on data observed through monitoring low level system events. To verify lateral coherency, that is, proper instruction execution ordering across the multiple processors, according to the model illustrated in FIG. 1, conventional verification schemes require exact completion times for store instructions issued by the multiple processors which modify data associated with a single memory address. However, in practice, low level details such as the completion times of stores from each of the processors are often unavailable.

Consequently, it would be desirable to provide an improved method and system for verifying instruction execution ordering within a multiprocessor data processing system which do not require the monitoring of low level events within the data processing system.

SUMMARY OF THE INVENTION

It is therefore one object of the present invention to provide an improved method and system for verifying proper operation of a data processing system.

It is another object of the present invention to provide an improved method and system for verifying proper operation of a multiprocessor data processing system.

It is yet another object of the present invention to provide an improved method and system for verifying instruction execution ordering within a multiprocessor data processing system.

The foregoing objects are achieved as is now described. A method and system are disclosed for verifying consistency of an instruction execution order of a multiprocessor data processing system with a specified memory consistency model. Each processor within the multiprocessor data processing system executes instructions from an associated one of a number of instruction streams, which include instructions that store a number of unique values from multiple processors to a single selected address within memory. One of the unique values is loaded from the selected address to a particular processor within the data processing system. A set of valid values which may be returned by the loading step is determined according to the specified memory consistency model. By comparing the unique value with members of the set of valid values, the instruction execution order of the multiprocessor data processing system is verified. Utilizing the unique value which was returned by the load instruction, the set of valid values may then be updated.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 2:
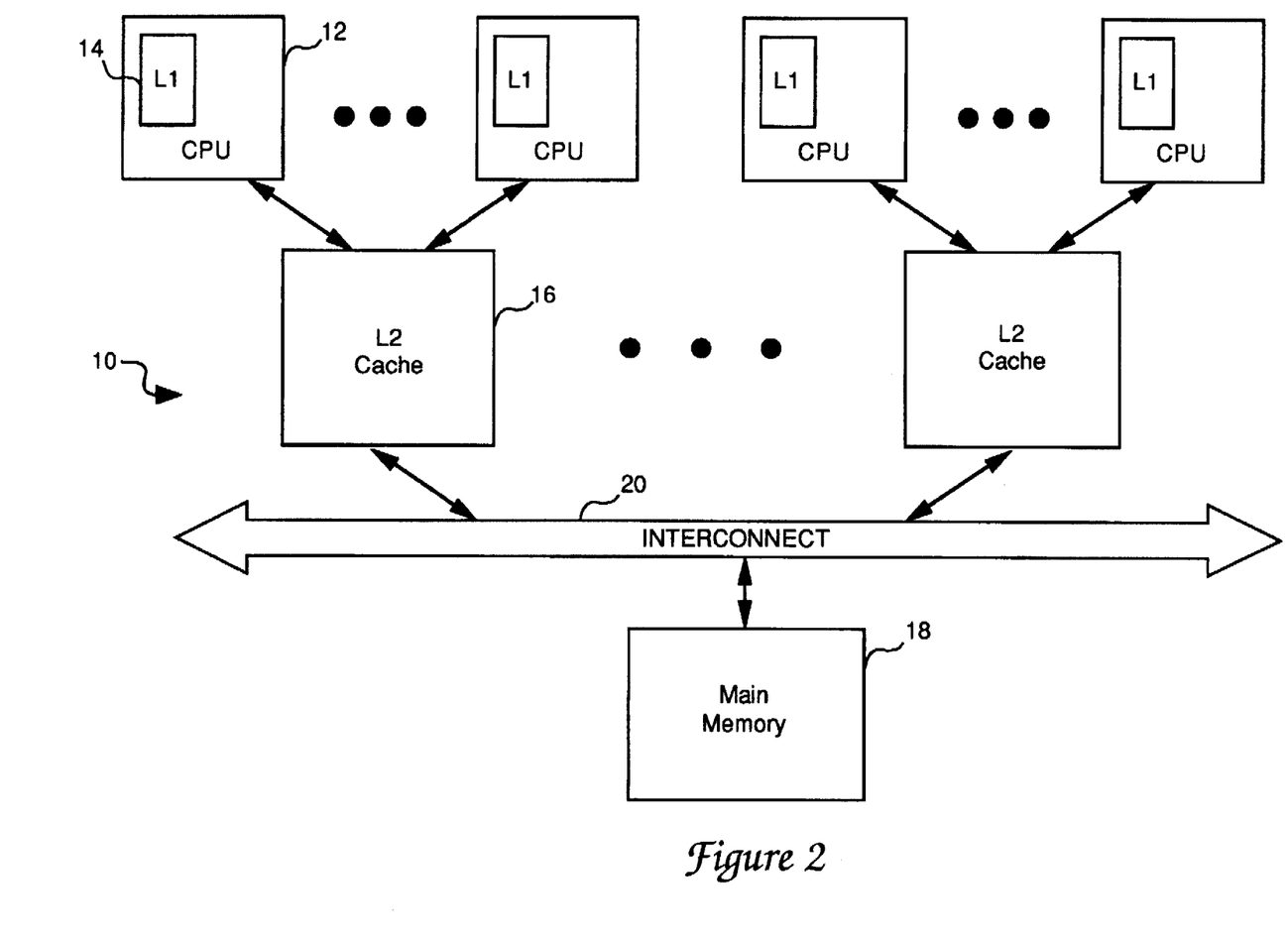
FIG. 2 depicts a block diagram of a preferred embodiment of a multiprocessor data processing system to which the method and system of the present invention may be advantageously applied.

With reference now to the figures, and in particular with reference to FIG. 2, there is illustrated a preferred embodiment of a multiprocessor data processing system to which the method and system of the present invention may be advantageously applied. As illustrated, data processing system 10 includes a number of central processing units (CPUs) 12, which each include an on-board level one (L1) cache 14. Each L1 cache 14 comprises a small amount of high speed memory which stores a local copy of data utilized by its associated CPU 12. When data requested by a CPU 12 is not resident within its associated L1 cache 14, CPU 12 will attempt to load the requested data from an associated L2 cache 26 which comprises the second level of the memory hierarchy. As depicted, each L2 cache 26 may be shared by multiple CPUs 12. When data requested by a CPU 12 are not resident within its associated L1 cache 14 or L2 cache 16, L2 cache 16 will forward the request to main memory 18, which is coupled to each of L2 caches 16 via interconnect 20.

After a CPU 12 modifies a local copy of data resident within its L1 cache 14, CPU 12 stores the modified data back to L1 cache 14. Depending upon the memory management protocol (e.g., write-through or write-back) implemented within data processing system 10, the modified data may be written simultaneously to main memory 18 or may be written at a later time when a copy back operation is performed. Because each CPU 12 can modify a local copy of data associated with an address within main memory 18 by issuing store instructions, data processing system 10 must employ a memory consistency model that specifies an execution order for instructions that modify data associated with a single address within main memory 18. As described above, the memory consistency model prescribes both a vertical consistency for each individual CPU 12 and a lateral consistency between multiple CPUs 12. The implementation of an architecturally determined memory consistency model within data processing system 10 eliminates coherency errors arising from variances in the timing of data modifications propagating through the memory hierarchy.

Figure 3A:
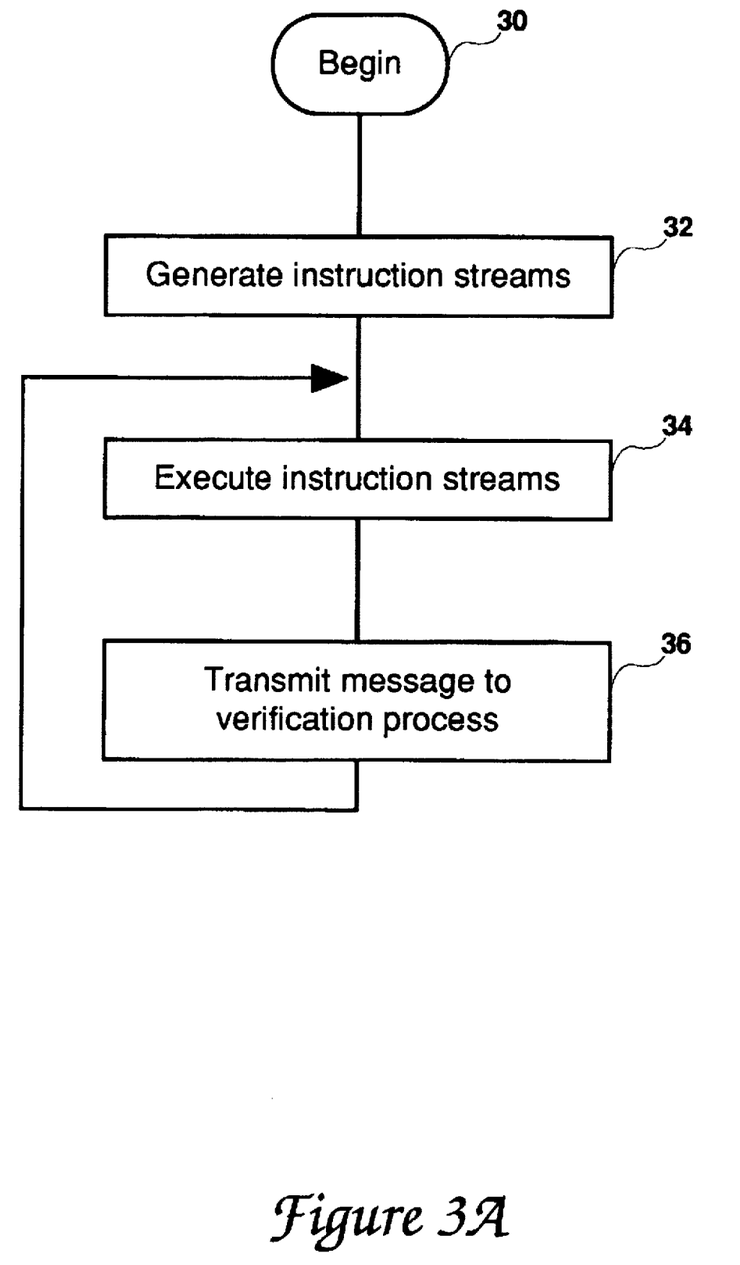
FIGS. 3A and 3B are flowcharts illustrating the method utilized by the present invention to verify instruction execution ordering within a multiprocessor data processing system.
Figure 3B:
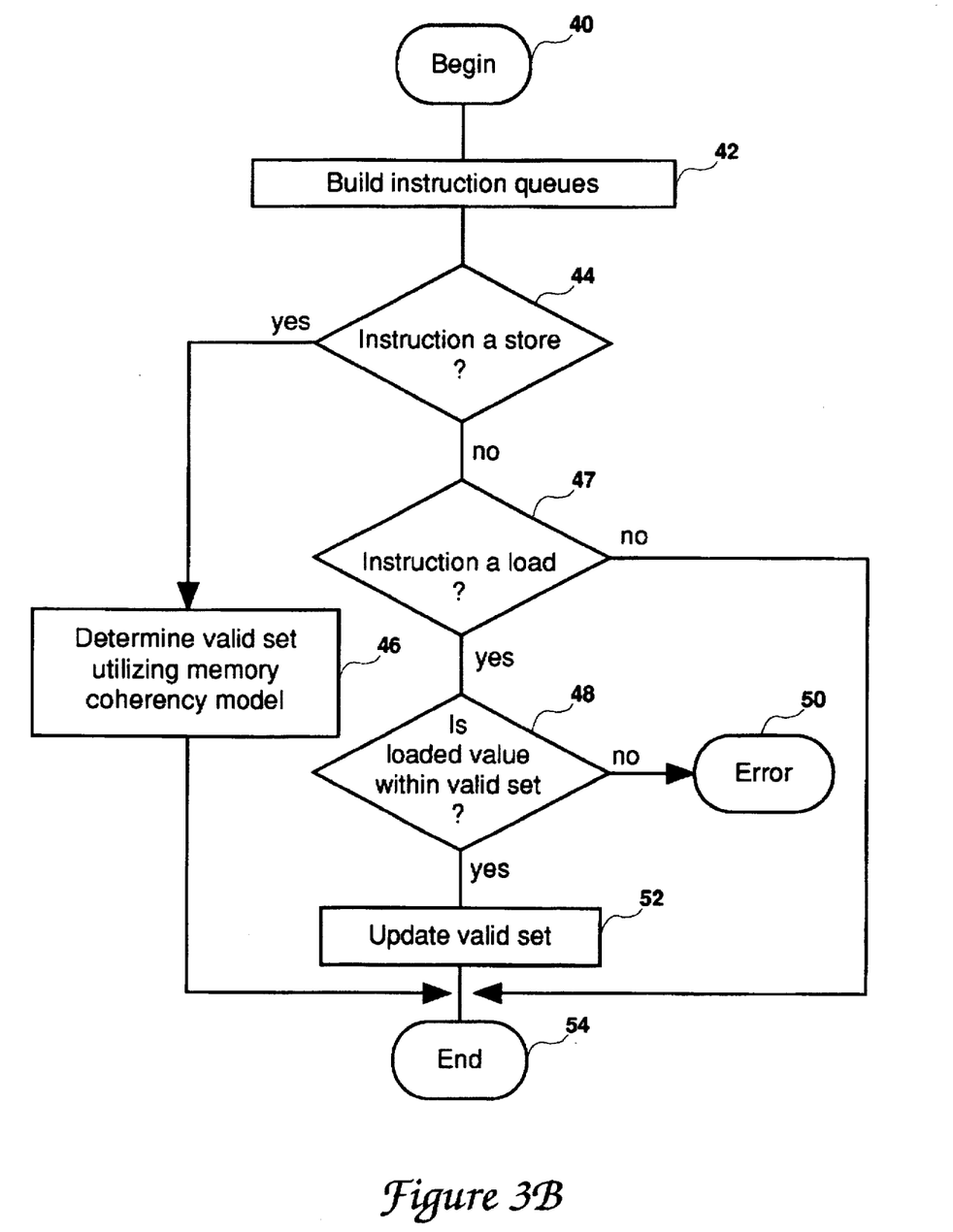

Referring now to FIGS. 3A and 3B, there are illustrated two flowcharts which depict the method utilized by the present invention to verify consistency of the instruction execution ordering of a multiprocessor data processing system with a specified memory consistency model. As will be appreciated by those skilled in the art, the method illustrated in FIGS. 3A and 3B may be utilized both as a design tool to analyze the operation of modeled data processing systems and to verify and test the design of an actual data processing system, such as data processing system 10 of FIG. 2. For example, the processes depicted in FIGS. 3A and 3B may be implemented as a computer-aided design (CAD) software tool utilized to evaluate proper execution ordering within a computer-modeled multiprocessor data processing system. Alternately, the processes illustrated in FIGS. 3A and 3B may be implemented as a diagnostic tool utilized to verify proper operation of an actual multiprocessor data processing system.

Referring first to FIG. 3A, the process begins at block 30 and thereafter proceeds to block 32, which depicts the multiprocessor data processing system under test (e.g., data processing system 10) constructing an instruction stream for each CPU 12. Each instruction stream may contain a variety of instruction types, but will contain at least some instructions which store data to and load data from addresses within main memory 18. Although these instruction types will be described hereinafter as "store" and "load" instructions, those skilled in the art will appreciate that these designations represent a variety of instructions within the instruction set of CPUs 12 that load data from and store data to addresses within main memory 18. Unlike verification methodologies which implement false sharing, the present invention allows the instruction streams generated at block 32 to include load and store instructions issued from multiple CPUs 12 to the same address. In order to determine the execution order of store instructions issued from multiple CPUs 12 to a single address, the present invention utilizes arbitrary data for store operands, with the restriction that the operands for all unresolved store instructions must be unique. Because unique data are utilized, when multiple CPUs 12 issue store instructions to a single address the present invention enables verification of execution ordering by simply loading the contents of the selected address. Thus, the present invention eliminates the necessity of monitoring the completion times of store instructions for each CPU 12, as is required in conventional methods of memory consistency model verification. However, as will be described below, if completion times of store instructions issued by CPUs 12 are available, the present invention utilizes the additional data to enhance the precision of verification provided.

Figure 4:
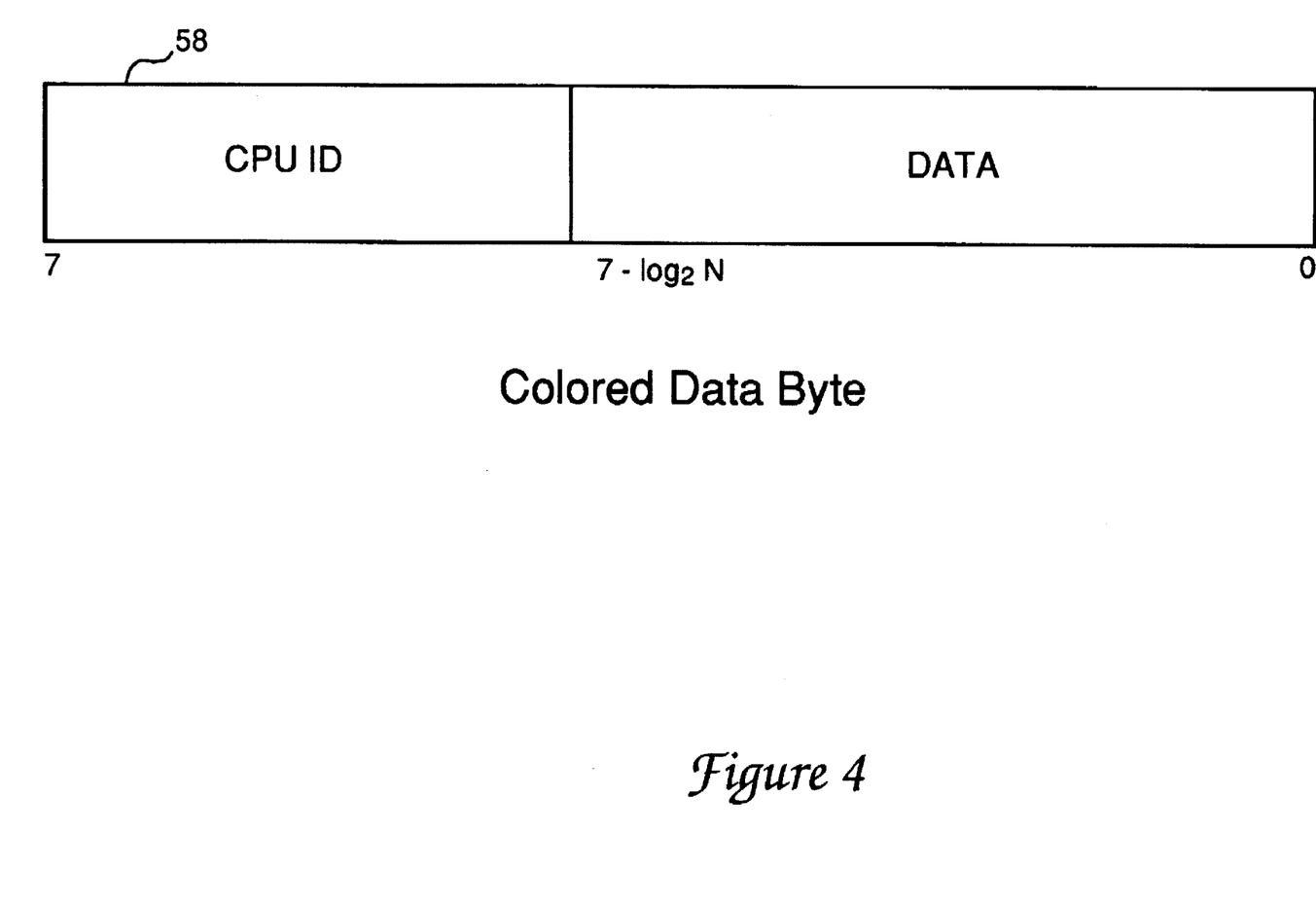
FIG. 4 depicts a preferred embodiment of unique data utilized within the method illustrated in FIGS. 3A and 3B.

With reference now to FIG. 4, there is illustrated a preferred embodiment of a unique data byte utilized in conjunction with the present invention. Data byte 58 comprises eight bits, log$_2$N of which are "colored" with a CPU ID that specifies which of the N CPUs 12 issued data byte 58 as the operand of a store instruction. The remaining bits contain unique data, such as a monotonically increasing value. As will be appreciated by those skilled in the art, data byte 58 may be replicated as many times as necessary to satisfy the operand length required by a particular data processing system. Although colored data byte 58 illustrated in FIG. 4 is a preferred embodiment of the unique data generated at block 32, those skilled in the art will appreciate that any arbitrary data may be utilized as long as pending store instruction operands are not duplicated between CPUs 12 during verification.

Returning to FIG. 3A, the process proceeds from block 32 to block 34, which illustrates each CPU 12 within data processing system 10 executing its associated instruction stream. Those skilled the art will appreciate that the execution of an instruction by a CPU 12 is a process comprising a number of steps, including issuance, when execution is initiated, and completion, when the instruction is retired. Since load and store instructions issued by CPUs 12 to differing addresses present no possibility of an ordering violation across processors, the subsequent discussion will describe instructions issued to a single address within main memory 18. The process proceeds from block 34 to block 36, which depicts each CPU 12 transmitting a message to the monitoring process depicted in FIG. 3B that describes what instruction was executed at block 34. As mentioned above, relative completion times of instructions issued by multiple CPUs 12 may not be available since the availability of completion times depends upon the provision of facilities to monitor such information. However, issuance and completion of load and store instructions may readily be monitored by snooping communication between each CPU 12 and its associated caches. Thereafter, the process returns from block 36 to block 34, where execution of the instruction streams continues.

Referring now to FIG. 3B, there is depicted a process that operates concurrently with the process illustrated in FIG. 3A to verify compliance of instruction execution ordering within data processing system 10 with the selected memory consistency model. The process begins at block 40 when a message is received from the process depicted in FIG. 3A, indicating which instruction was issued or completed by a particular CPU 12 and the instruction's operand value, if any. Utilizing the information within messages transmitted by each CPU 12, the process at block 42 builds instruction queues that list in execution order the instructions (and their associated operands) within each instruction stream. The process then proceeds to block 44, which illustrates determining if the message received at block 40 specified that a store instruction was executed. If the message indicates that the instruction is a store, the process proceeds from block 44 to block 46.

Block 46 illustrates applying the memory consistency model implemented within data processing system 10 to the instruction queues constructed at block 42 to update a set of valid data values for the selected address within main memory 18. As will be appreciated by those skilled in the art, in data processing systems which employ a sequential consistency model, the set of valid values will be singular since systems which employ a strong consistency model execute instructions in strict chronological order. Thus, if the current store instruction has completed, the valid data value for the address will be the operand of the current store instruction. However, in data processing system which enforce a weak consistency model that allows out of order execution, many valid values are possible since the completion order of instructions is not predetermined by the memory consistency model. For a particular CPU 12, the valid set determined at block 46 will include the last store completed by that CPU 12 (i.e., the current store instruction), the last store completed by other CPUs 12 which were verified by loads to the particular CPU 12, and pending store instructions from the other CPUs 12. Operand values of prior store instructions completed by the particular CPU 12 can be eliminated from the set of valid values since these operand values will have been overwritten by the operand value of the current store instruction. Thereafter, the process terminates at block 54.

Returning to block 44, if the instruction specified in the message received at block 40 is not a store instruction, the process proceeds to block 47, which illustrates determining if the instruction contained in the message is a load. If the instruction is not a load, the process terminates at block 54. However, if the instruction specified by the message is a load, the process proceeds to block 48, which depicts determining if the value returned by the load instruction to the CPU 12 which executed the load is within the set of valid values constructed for that CPU 12 at block 46. If the value returned by the load instruction is not within the set of valid values, then an instruction execution order violation is reported at block 50. For example, if the present invention were implemented within a CAD tool, at block 50 the CAD program would notify the user that an architectural error within the modeled data processing system had been detected. If, however, the value returned by the load is within the valid set, the process proceeds to block 52, which illustrates updating the set of valid values for the selected address by eliminating operands of store instructions that are known to have completed prior to the instruction whose operand was loaded from the selected address. Thus, as will be appreciated by those skilled in the art, utilizing unique store instruction operands, such as data byte 58 of FIG. 4, enables members of the valid set to be cast out since loading the value of the selected address reveals which of a number of pending store instructions completed last. When relative completion times for all store instructions issued by each CPU 12 are available, for example, in computer-modeled multiprocessor data processing systems, the size of the set of valid values may be further reduced by eliminating all members from the set of valid values whose associated store instructions are known to have completed before other instructions that completed prior to the load instruction. The process then proceeds from block 52 to block 54, where the process terminates.

Figure 5:
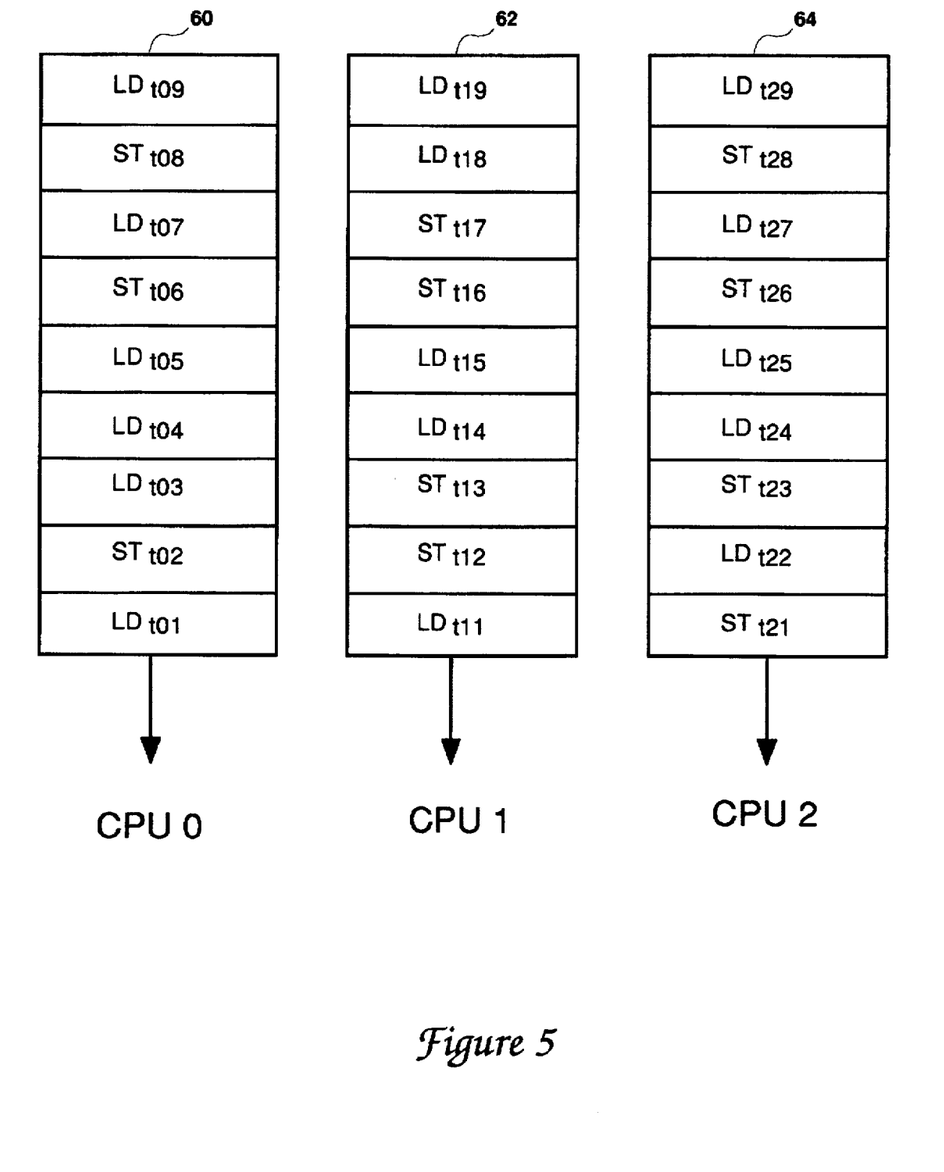
FIG. 5 illustrates an example of three instruction streams which are utilized to verify proper instruction execution ordering within a multiprocessor data processing system according to the method and system of the present invention.

Referring now to FIG. 5, the method of the present invention illustrated in FIGS. 3A and 3B will now be described with reference to an example in which the instruction execution ordering of a data processing system having three processors is verified. As depicted, instruction streams 60, 62, and 64, which are generated at block 32 of FIG. 3A, are to be executed by CPU0, CPU1, and CPU2, respectively. The instructions within each stream are indexed, with the first subscript denoting the instruction stream number and the second identifying an instruction's location within its instruction stream. Next, assume that $ST_{s02}$, $LD_{s14}$, $ST_{s12}$, $ST_{s13}$, and $ST_{s23}$ have issued but not completed and that $LD_{s03}$ is selected as a verification point when completed by CPU0 at block 34 of FIG. 3A. As described above, the execution of $LD_{s03}$ generates the transmission of a message that initiates the process depicted in FIG. 3B.

With reference now to block 42 of FIG. 3B, the instruction $LD_{s03}$ is added to the instruction queue corresponding to instruction stream 60. The process then proceeds from block 42 to block 44, which depicts determining if the instruction is a store. Since $LD_{s03}$ is a load instruction, the process proceeds from block 44 through block 47 to block 48, which illustrates determining if the value returned by $LD_{s03}$ is a member of the set of valid values for CPU0 previously constructed at block 46.

In the present example, the multiprocessor data processing system under test employs a weak consistency model defined by the following rules:

1. Loads and stores from the same CPU to different addresses may execute in any order;
2. Loads from a CPU to a particular address will wait for the completion of stores from the same CPU to the same address; and
3. Loads and stores from different CPUs may execute in any order, unless a synchronization point, such as an atomic load/store operation, is present.

Thus, when the completion times of preceding store instructions are not known, the general rule for construction of valid sets for each processor is as follows:

$$V(LD_{it})=ST_{itLast} \cup (\forall (j \neq i))[ST_{jNV} \cup ST_{jL}],$$

where $LD_{it}$=load from CPU i at time t;

$V(LD_{it})$=value returned by load $LD_{it}$;

$ST_{itLast}$=last store from CPU i prior to time t;

$ST_{jNV}$=all stores issued from CPU j, prior to time t, but not verified at CPU i; and $ST_{jL}$=last store from CPU j verified as completed by a load instruction issued by CPU i.

Applying these construction rules for valid sets to instruction streams 60–64 illustrated in FIG. 5, the equation for determining the valid set if given by $V(LD_{03})=ST_{i02} \cup (\forall (j \neq 0))[ST_{jNV} \cup ST_{jL}]$. Thus, by inspection of instruction streams 60–64, it is apparent that the valid set for $LD_{i03}$ is $\{ST_{t13}; ST_{t12}; ST_{t23}; ST_{i02}\}$. However, if store completion times are available, the cardinality of the valid set may be reduced. For example, if $ST_{i02}$ and $ST_{t23}$ both completed prior to $LD_{i03}$ and $ST_{t23}$ completed after $ST_{i02}$, then the valid set for $LD_{i03}$ comprises $ST_{t13}$ and $ST_{t12}$.

Returning to block 48 of FIG. 3B, the value loaded from the selected address at block 48 is compared to the valid set constructed for CPU0 at block 46. If the loaded value is not within the set of valid values, then an error in the instruction execution ordering of the data processing system under test is detected and the process terminates at block 50. However, if the instruction execution ordering of the data processing system is verified, the process utilizes the value returned by the load instruction to update the valid set at block 52. If the value returned by the load instruction was the last store issued by CPU i (i.e., CPU0), the valid set is updated at block 52 by removing values from the valid set that were operands of store instructions issued from CPU i, except for the last store value ($ST_{itLast}$). If the value returned by the load instruction was not the last store from CPU i, the valid set is updated by removing all values from the valid set that were stores from CPU i prior to the load instruction. Thus, to complete the example, if the value returned by $LD_{i03}$ is $ST_{i02}$, then the process determines that $ST_{i02}$ has completed, but that the status of $ST_{t13}$, $ST_{t12}$, and $ST_{t23}$ is unknown. Therefore, the valid set is updated by discarding all operands of store instructions issued by CPU0, except for $ST_{i02}$. In the present example, no values are discarded in this case and the valid set visible to $LD_{i04}$, the subsequent load from CPU0, remains $\{ST_{t13}; ST_{t12}; ST_{t23}; ST_{i02}\}$. On the other hand, if the value returned by $LD_{i03}$ is $ST_{t13}$, the process determines that $ST_{t13}$ completed after $ST_{t12}$ and $ST_{i02}$. Therefore, the valid set for CPU0 is updated by eliminating $ST_{i02}$ and $ST_{t12}$, leaving the valid set $\{ST_{t13}; ST_{t23}\}$.

As has been described, the present invention provides an improved method and system for verifying execution ordering within a multiprocessor data processing system. The present invention has the advantage that the enforcement of a selected memory consistency model may be verified without requiring the data processing system to monitor the completion times of store instructions. However, if completion times of store instructions are available, the present invention utilizes the additional information to more precisely delineate proper execution ordering outcomes within the data processing system.

While the invention has been particularly shown and described with reference to a preferred embodiment, it will be understood by those skilled in the art that various changes in form and detail may be made therein without departing from the spirit and scope of the invention.

What is claimed is:

1. A system for verifying consistency of an instruction execution order of a multiprocessor data processing system with a specified memory consistency model, said multiprocessor data processing system having plurality of processors and a memory, wherein each of said plurality of processors executes instructions from an associated instruction stream, said system comprising:

means for storing a plurality of unique values from said plurality of processors to a single selected location within said memory in an instruction execution order, said single selected location storing at most one of said plurality of unique values at a time;

means for loading a unique value among said plurality of unique values from said single selected location to a particular processor among said plurality of processors;

means for determining, in accordance with said specified memory consistency model, a set of valid values which may be loaded from said single selected location;

means for comparing said unique value with members of said set of valid values, and means for indicating that said instruction execution is improper in response to determining from said comparison that said unique value among said plurality of unique values is not a member of said set of valid values.

2. The system for verifying consistency of an instruction execution order of claim 1, said method further comprising:

means for removing each unique value from said set of valid values which corresponds to a store instruction known to have completed prior to a store instruction corresponding to another unique value within said set of valid values.

3. The system for verifying consistency of an instruction execution order of claim 1, wherein a unique value among said plurality of unique values comprises data encoded with an identifier specifying which processor among said plurality of processors stored said unique value to said selected address.

4. The system for verifying consistency of an instruction execution order of claim 1, wherein said multiprocessor data processing system employs a weak consistency model of instruction execution ordering.

5. The system for verifying consistency of an instruction execution order of claim 4, wherein said set of valid values comprises a unique value associated with a most recent store issued by said particular processor, all unique values associated with store instructions not verified to have completed that were issued by processors among said plurality of processors other than said particular processor, and unique values associated with a last store instruction issued by each processor among said plurality of processors other than said particular processor that was verified as completed by a load instruction issued by said particular processor.

6. A method, within a multiprocessor data processing system having a plurality of processors and a memory, for verifying consistency of an instruction execution order with a specified memory consistency model, wherein each of said plurality, of processors executes instructions from an associated instruction stream, said method comprising:

storing a plurality of unique values from said plurality of processors to a single selected location within said memory in an instruction execution order, said single selected location storing at most one of said plurality of unique values at a time;

loading a unique value among said plurality of unique values from said single selected location to a particular processor among said plurality of processors;

determining in accordance with said specified memory consistency model, a set of valid values which may be returned by said loading step;

comparing said unique value with members of said set of valid values, and in response to determining from said comparison that said unique value among said plurality of unique values is not a member of said set of valid values, indicating that said instruction execution order is improper.

7. The method for verifying consistency of an instruction execution order of claim 6, said method further comprising:

removing each unique value from said set of valid values which corresponds to a store instruction known to have completed prior to a store instruction corresponding to another unique value within said set of valid values.

8. The method for verifying consistency of an instruction execution order of claim 6, wherein a unique value among said plurality of unique values comprises data encoded with an identifier specifying which processor among said plurality of processors stored said unique value to said selected address.

9. The method for verifying consistency of an instruction execution order of claim 6, wherein said multiprocessor data processing system employs a weak consistency model of instruction execution ordering.

10. The method for verifying consistency of an instruction execution order of claim 9, wherein said set of valid values comprises a unique value associated with a most recent store issued by said particular processor, all unique values associated with store instructions not verified to have completed that were issued by processors among said plurality of processors other than said particular processor, and unique values associated with a last store instruction issued by each processor among said plurality of processors other than said particular processor that was verified as completed by a load instruction issued by said particular processor.

* * * * *

UNITED STATES PATENT AND TRADEMARK OFFICE
CERTIFICATE OF CORRECTION

PATENT NO. : 5,692,153
DATED : November 25, 1997
INVENTOR(S) : Malik et al.

It is certified that error appears in the above-indentified patent and that said Letters Patent is hereby corrected as shown below:

Column 2, line 57: change "lcad" to --load--

Signed and Sealed this

Tenth Day of March, 1998

Attest:

BRUCE LEHMAN

Attesting Officer

Commissioner of Patents and Trademarks